United States Patent [19]

Liu

[11] Patent Number: 5,715,576
[45] Date of Patent: Feb. 10, 1998

[54] HINGE DEVICE FOR COUPLING TWO ROTATABLE MEMBERS

[76] Inventor: Tai-Sheng Liu, 2F, No. 25, Lane 75, Jung AN 15th Street, Chung Li City, Taiwan

[21] Appl. No.: 794,456

[22] Filed: Feb. 4, 1997

[51] Int. Cl.⁶ .................... E05C 17/64; E05D 11/08
[52] U.S. Cl. .................... 16/342; 16/303; 16/341; 16/329
[58] Field of Search .................... 16/342, 341, 284, 16/285, 296, 303, 304, 307, 329, 330, 331

[56] References Cited

U.S. PATENT DOCUMENTS

| | | | |
|---|---|---|---|
| 4,030,161 | 6/1977 | Loikitz | 16/284 |
| 5,075,929 | 12/1991 | Chung | 16/342 |
| 5,109,571 | 5/1992 | Ohshima et al. | 16/307 |
| 5,138,743 | 8/1992 | Hoffman | 16/303 |
| 5,222,260 | 6/1993 | Piper | 16/303 |
| 5,333,356 | 8/1994 | Katagiri | 16/342 |

FOREIGN PATENT DOCUMENTS

| | | | |
|---|---|---|---|
| 1155411 | 4/1958 | France | 16/342 |
| 562695 | 10/1932 | Germany | 16/342 |

*Primary Examiner*—Chuck Mah
*Attorney, Agent, or Firm*—Charles E. Baxley, Esq.

[57] ABSTRACT

A hinge device for coupling two rotatable members includes a stud and a shaft extended from one rotatable member and a barrel secured on the other rotatable member. The stud has a coarse wedge shaped projection. The barrel includes a coarse frustum shaped inner peripheral surface for engaging with a coarse frustum shaped outer peripheral surface of an actuator. The actuator includes a notch having a coarse tapered surface for engaging with the coarse projection. A spring may bias the coarse surfaces to engage with each other for allowing the rotatable members to be maintained in any suitable relative angular position.

1 Claim, 4 Drawing Sheets

HINGE DEVICE FOR COUPLING TWO ROTATABLE MEMBERS

BACKGROUND OF THE INVENTION

1. Field of the Invention

The present invention relates to a hinge device, and more particularly to a hinge device for coupling two rotatable members.

2. Description of the Prior Art

Typical hinge devices for two rotatable members comprise a complicated configuration including a number of elements that are required to be engaged in the pivot axle for coupling the two rotatable members. In addition to the complicated configuration, the two rotatable members may not be maintained in any suitable relative angular position.

The present invention has arisen to mitigate and/or obviate the afore-described disadvantages of the conventional hinge devices for coupling two rotatable members.

SUMMARY OF THE INVENTION

The primary objective of the present invention is to provide a hinge device which may maintain two rotatable members at any suitable relative angular position.

In accordance with one aspect of the invention, there is provided a hinge device for coupling a first and a second rotatable members, the hinge device comprises a stud and a shaft extended from the first rotatable member, the stud including a wedge shaped projection having a coarse surface, a barrel secured on the second rotatable member, the barrel including a coarse frustum shaped inner peripheral surface, an actuator slidably engaged in the barrel and engaged on the shaft, the actuator including a coarse frustum shaped outer peripheral surface for engaging with the coarse frustum shaped inner peripheral surface of the barrel, the actuator including a notch having at least one coarse tapered surface for engaging with the projection of the stud, and leans for biasing the coarse frustum shaped outer peripheral surface of the actuator to engage with the coarse frustum shaped inner peripheral surface of the barrel and for allowing the first and the second rotatable members to be maintained in any suitable relative angular position.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
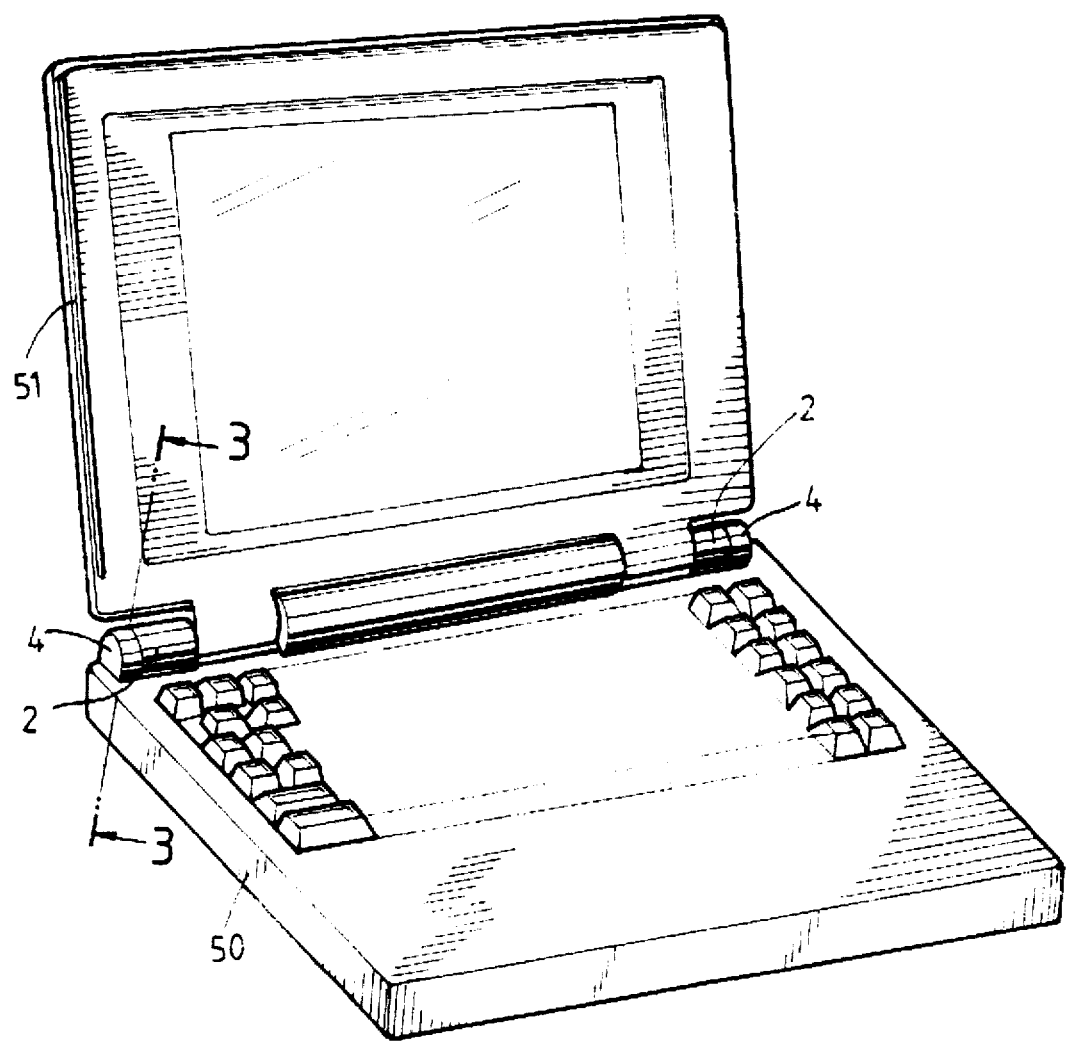
FIG. 1 is a perspective view of a note book type computer which employs the hinge device in accordance with the present invention.
Figure 2:
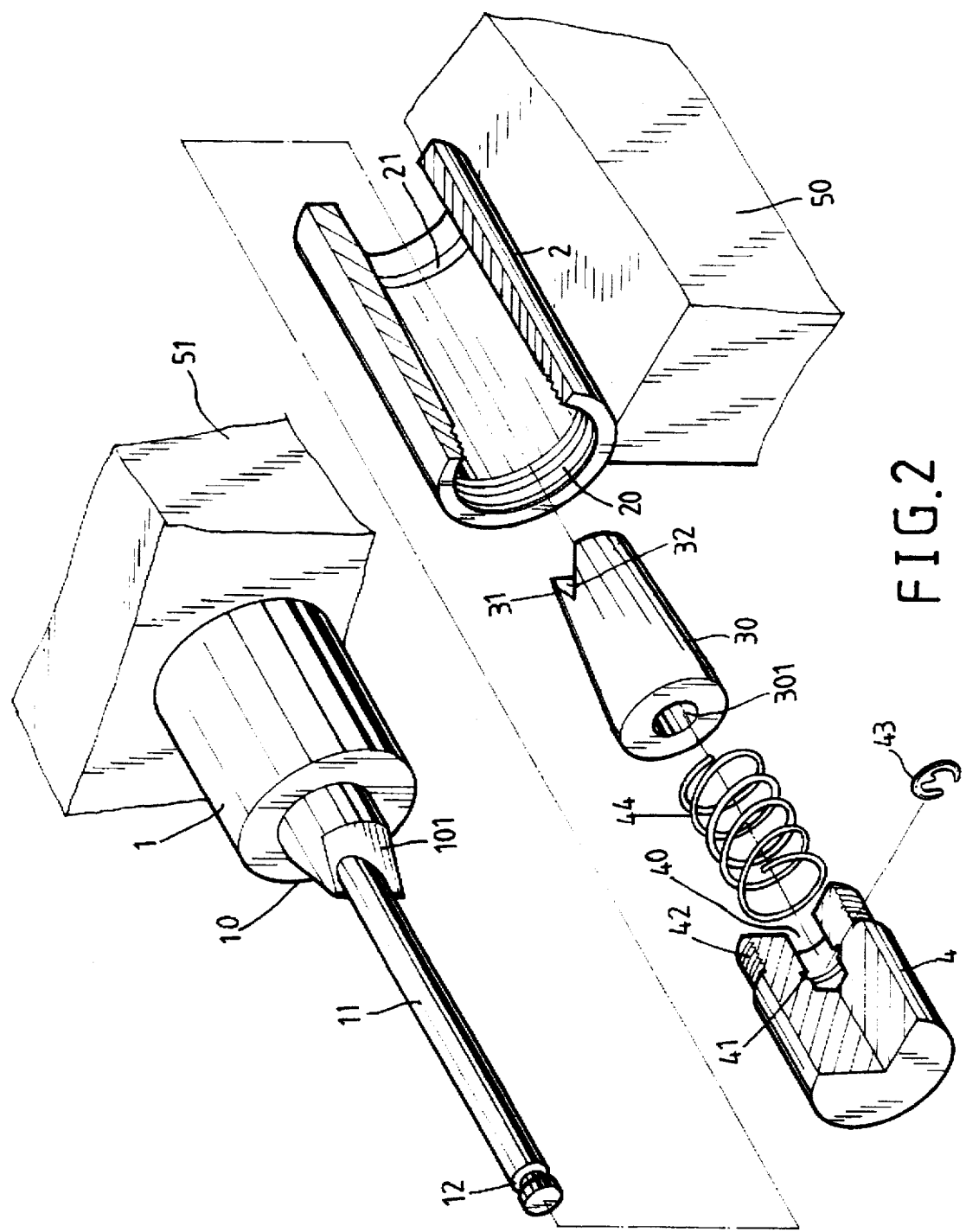
FIG. 2 is an exploded view of the hinge device.
Figure 3:
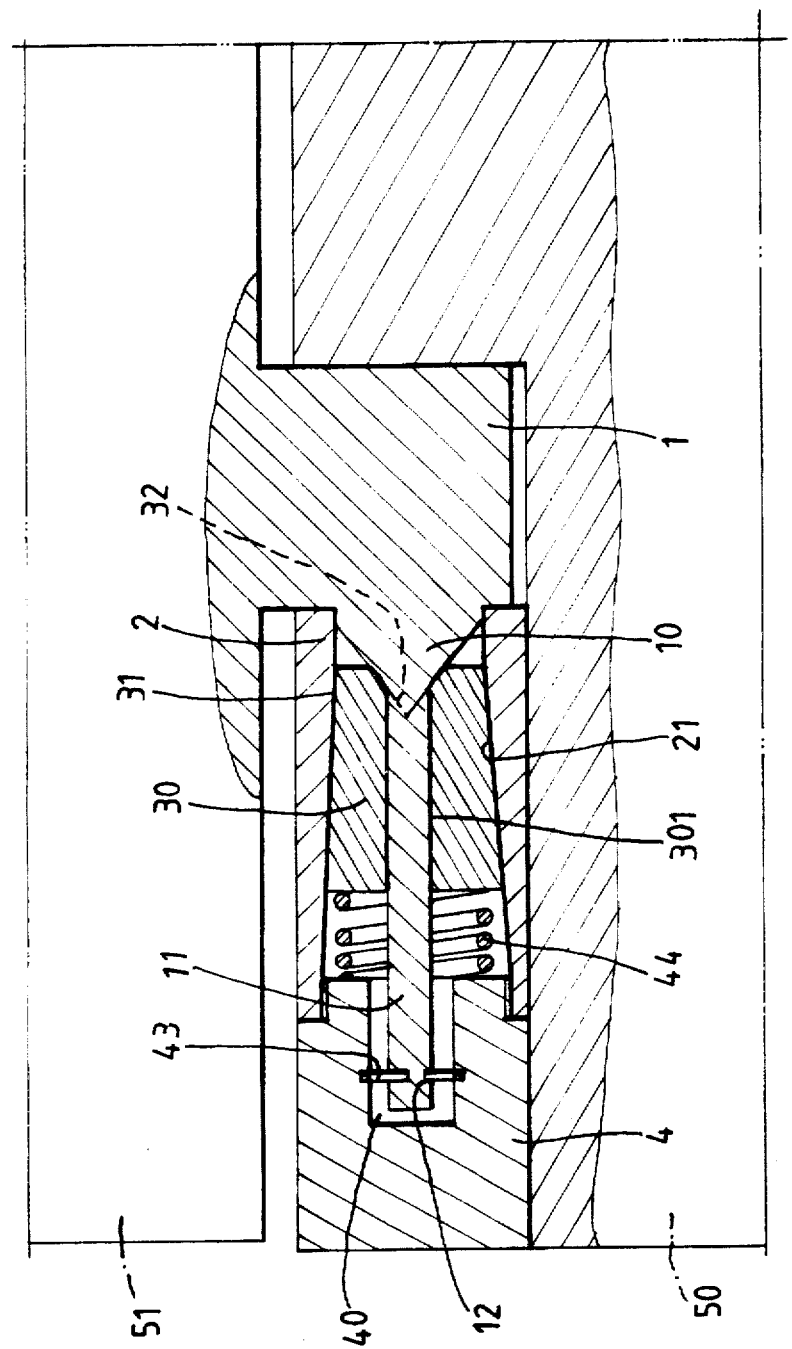
FIGS. 3 and 4 are cross sectional views taken along lines 3—3 of FIG. 1, illustrating the operation of the hinge device.
Figure 4:
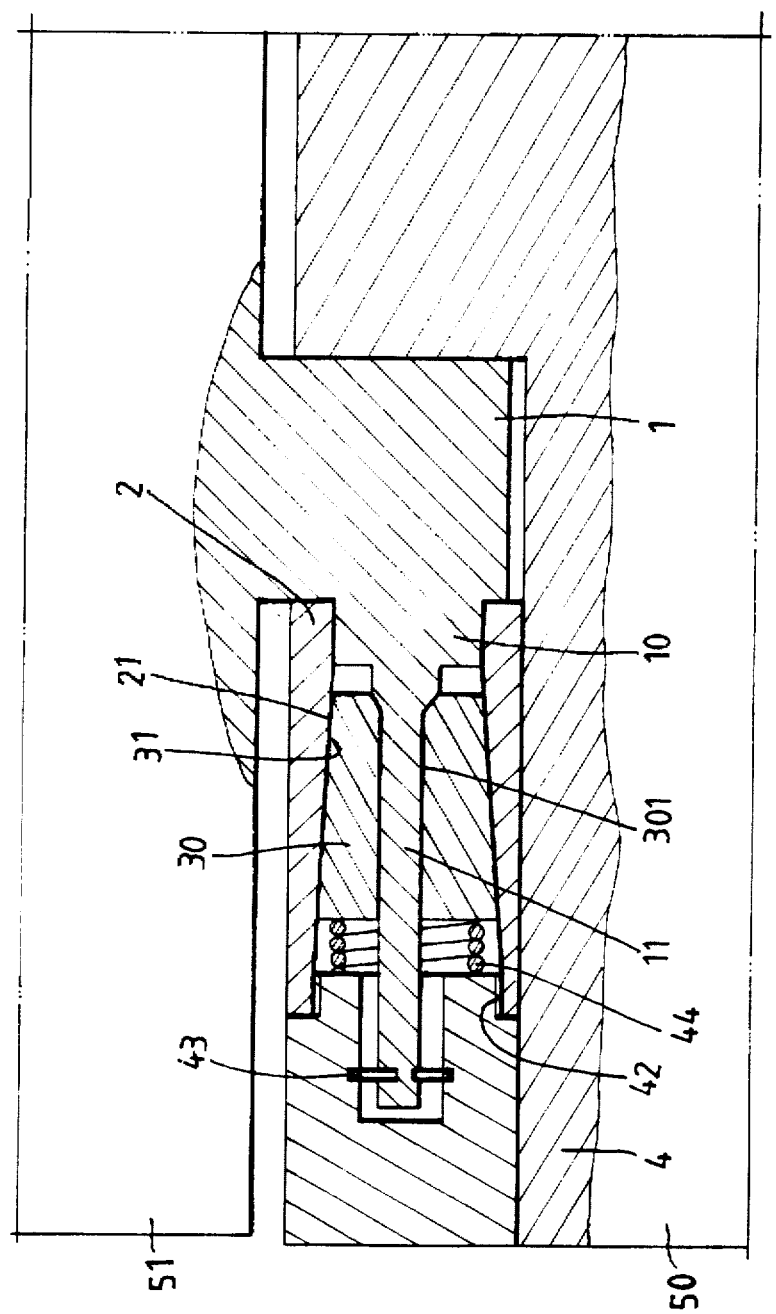

Referring to the drawings, and initially to FIGS. 1 to 3, a hinge device in accordance with the present invention is provided for coupling two rotatable members together, such as the base 50 and the cover 51 of a note book type computer (FIG. 1). The hinge device comprises a rod 1 extended from the cover 51, for example. A stud 10 and a shaft 11 extend from the rod 1 and are engaged in a barrel 2. The stud 10 includes a wedge shaped projection 101. The shaft 11 includes an annular groove 12 formed in the free end for engaging with a clamping ring 43. The barrel 2 is secured or formed on the base 50, for example and includes a frustum shaped peripheral surface 21 formed in one end and includes an inner thread 20 formed in the other end. An actuator 30 is slidably engaged in the barrel 2 and includes a bore 301 for rotatably engaging with the shaft 11 and includes a frustum shaped peripheral surface 31 for engaging with the frustum shaped peripheral surface 21 of the barrel 2. The actuator 30 includes a notch 32 having one or a pair of tapered surfaces for engaging with the wedge shaped projection 101 of the stud 10 (FIGS. 3, 4). A cap 4 includes an outer thread 42 for engaging with the inner thread 20 of the barrel 2 and for allowing the cap 4 to be secured to the barrel 2. The cap 4 includes a hole 40 for engaging with the end portion of the shaft 11 and includes an annular slot 41 for engaging with the clamping ring 43 which may rotatably couple the shaft 11 to the cap 4. A spring 44 is engaged between the cap 44 and the actuator 30 for biasing the actuator 30 to engage with the barrel 2.

It is to be noted that the frustum shaped peripheral surfaces 21 and 31 of the barrel 2 and the actuator 30, and the projection 101 and the tapered surface of the actuator 30 are formed as coarse surfaces by such as sand blasting process, for increasing the frictional force between the contacting surfaces.

In operation, as shown in FIGS. 3 and 4, and as shown in FIG. 1, the coarse peripheral surface 31 of the actuator 30 is forced to engage with the coarse peripheral surface 21 of the barrel 2 by the spring 33, and the wedge shaped projection 101 of the stud 10 is engaged in the notch 32 of the actuator 30. When the cover 51 is rotated relative to the base 50, the frictional force between the coarse peripheral surfaces may apply a resistance force against the rotational movement between the base 50 and the cover 51. The actuator 30 may be slightly moved against the spring 44 by the engagement between the projection 101 and the tapered surface of the notch 32 of the actuator 30. The frictional force between the projection 101 and the actuator 30 and the biasing force of the spring 44 against the actuator 30 may maintain the cover 51 at any suitable angular position relative to the base 50.

It is to be noted that the hinge device includes a greatly simplified configuration having only three elements that are required to be assembled. It is only required to engage the actuator 30 and the spring 44 onto the shaft 11 and to thread the cap 4 to the barrel 2 such that the hinge device may be easily assembled.

Accordingly, the hinge device in accordance with the present invention may maintain two rotatable members at any suitable relative angular position. In addition, the hinge device includes a greatly simplified configuration for allowing the manufacturing cost of the hinge device to be greatly lowered.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hinge device for coupling a first and a second rotatable members, said hinge device comprising:

a stud and a shaft extended from the first rotatable member, said stud including a wedge shaped projection having a coarse surface, a barrel secured on the second rotatable member, said barrel including a coarse frustum shaped inner peripheral surface, an actuator slidably engaged in said barrel and engaged on said shaft, said actuator including a coarse frustum shaped outer peripheral surface for engaging with said coarse frustum shaped inner peripheral surface of said barrel, said actuator including a notch having at least one coarse tapered surface for engaging with said projection of said stud, and means for biasing said coarse frustum shaped outer peripheral surface of said actuator to engage with said coarse frustum shaped inner peripheral surface of said barrel and for allowing the first and the second rotatable members to be maintained in any suitable relative angular position.

* * * * *